United States Patent
Bertin

(10) Patent No.: US 9,338,151 B2
(45) Date of Patent: May 10, 2016

(54) METHOD AND DEVICE FOR CONTROLLING THE EXECUTION OF AT LEAST ONE FUNCTION IN A SHORT RANGE WIRELESS COMMUNICATION MODULE OF A MOBILE PHONE

(75) Inventor: Marc Bertin, La Celle les Bordes (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 813 days.

(21) Appl. No.: 12/526,673

(22) PCT Filed: Dec. 28, 2007

(86) PCT No.: PCT/FR2007/002183
§ 371 (c)(1),
(2), (4) Date: Aug. 11, 2009

(87) PCT Pub. No.: WO2008/102081
PCT Pub. Date: Aug. 28, 2008

(65) Prior Publication Data
US 2010/0105322 A1      Apr. 29, 2010

(30) Foreign Application Priority Data
Feb. 12, 2007   (FR) ..................... 07 53202

(51) Int. Cl.
*H04B 5/00*        (2006.01)
*H04L 29/06*       (2006.01)
(Continued)

(52) U.S. Cl.
CPC ............... *H04L 63/08* (2013.01); *G06F 21/35* (2013.01); *G06F 21/572* (2013.01); *G06F 21/606* (2013.01); *G06F 21/629* (2013.01); *H04L 63/0492* (2013.01); *H04W 8/183* (2013.01)

(58) Field of Classification Search
CPC ..... G06F 21/35; G06F 21/572; G06F 21/606; G06F 21/629; H04L 63/0492; H04L 63/08; H04W 8/183
See application file for complete search history.

(56) References Cited

U.S. PATENT DOCUMENTS

2004/0029563 A1   2/2004 Berg
2005/0116050 A1*  6/2005 Jei et al. .................. 235/492
(Continued)

FOREIGN PATENT DOCUMENTS

EP    1 701 559       9/2006
GB    2365699     *   3/2003   .............. H04Q 7/32
(Continued)

OTHER PUBLICATIONS
International Search Report dated Sep. 22, 2008, from corresponding PCT application.

*Primary Examiner* — Zhiyu Lu
(74) *Attorney, Agent, or Firm* — Young & Thompson

(57) ABSTRACT

A method and device for controlling the execution of at least one function in a short-range wireless communication module of a mobile apparatus adapted for receiving at least one identification card. After transmitting an information request to the identification card, to obtain at least one piece of information characteristic of the identification card, an answer including at least one piece of information characteristic of the identification card is received therefrom. When the answer is identified and in response to the at least one piece of information, the at least one function is executed. An authentication request is received by the short-range wireless communication module. If the answer is authenticated, the short-range wireless communication module sends an authorization to the authentication request in response to the at least one piece of information characteristic of the identification card before the execution of the at least one function.

21 Claims, 3 Drawing Sheets

Figure 1:
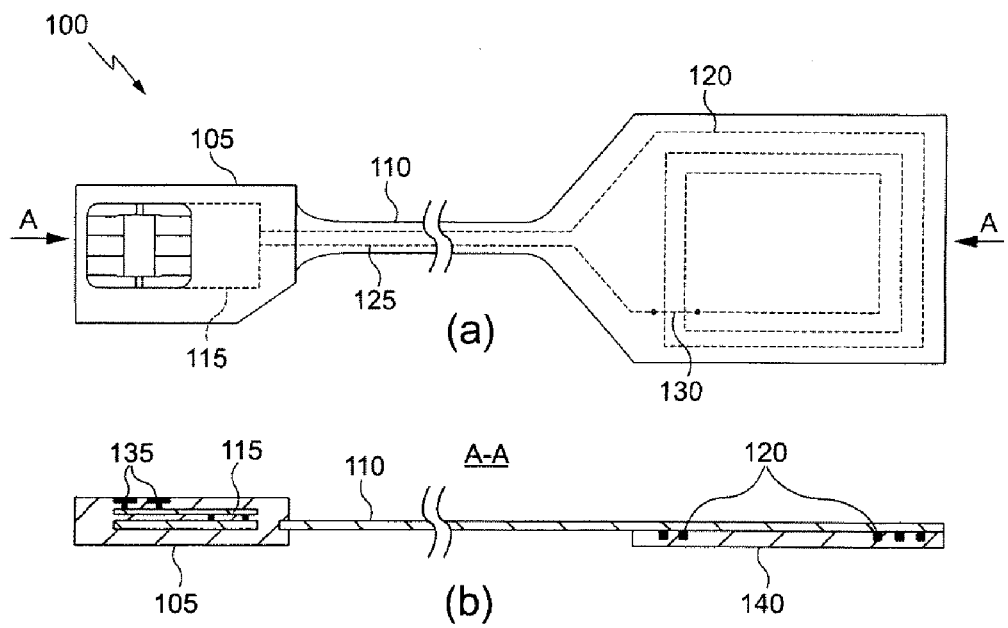

(51) Int. Cl.
*G06F 21/35* (2013.01)
*G06F 21/57* (2013.01)
*G06F 21/60* (2013.01)
*G06F 21/62* (2013.01)
*H04W 8/18* (2009.01)

(56) References Cited

U.S. PATENT DOCUMENTS

2007/0038854 A1* 2/2007 Cheon et al. ................ 713/156
2007/0082703 A1* 4/2007 Van Kleef ..................... 455/558
2008/0116264 A1* 5/2008 Hammad et al. ............. 235/382
2010/0064341 A1* 3/2010 Aldera ................ H04L 63/102
726/1

FOREIGN PATENT DOCUMENTS

| | | |
|---|---|---|
| WO | 01/45319 | 6/2001 |
| WO | 2005/096651 | 10/2005 |

\* cited by examiner

METHOD AND DEVICE FOR CONTROLLING THE EXECUTION OF AT LEAST ONE FUNCTION IN A SHORT RANGE WIRELESS COMMUNICATION MODULE OF A MOBILE PHONE

The present invention concerns the field of controlling execution of functions and more particularly mechanisms for authorizing and prohibiting execution of at least one function in a wireless near field communication module of a mobile apparatus according to an identifier of the mobile apparatus.

Whereas some services are offered without restrictions to possessors of mobile apparatus, possibly subject to the reservation that the apparatus has certain particular technical characteristics for using those services, there are numerous services that are accessible only to some users or to some mobile apparatus, for example users who have entered into particular contracts or subscriptions.

By way of illustration, telephone operators often finance the purchase of subscribers' mobile telephones subject to the subscriber signing a contract to remain a subscriber for a certain time. To prevent this contract being circumvented, mobile telephones are generally locked during the contract so that they can be used only on mobile telephone networks authorized by the telephone operator. This kind of mechanism can be implemented by the provider of the subscriber card using, for example, information contained in a SIM (Subscriber Identity Module) card conforming to a GSM or 3G standard. This is generally a software locking method that is relatively easy for a fraudster to circumvent, the operating system of the telephone having little or no protection.

In a similar manner, US patent application 2006/0112275 describes a hardware lock (dongle) used in a method for controlling communication between a SIM card, for example of the type used in a GSM telephone, and a computer, for example of the PC (Personal Computer) type. The SIM card can be authenticated by the telephone network in the same way as the SIM card of a mobile telephone is authenticated by the telephone network, thus enabling authentication of the user of the computer. Such authentication can allow use of the computer for a limited time period, for example to use a particular application loaded into the computer after authentication. The application can be loaded into the computer by a third party after and in response to authentication. Costs can be charged to the user by the communication network and passed on to the third party. The hardware lock provides additional security means for the authentication data stored in the SIM card by the use of a PIN (Personal Identification Number) code that must be entered and/or in response to requests from the computer, which requests are encrypted by means of a key and are generated by a particular interface of the computer.

Thus there exists a requirement to control access to some services from a device, preferably a mobile apparatus, according to certain characteristics of an identification card such as a SIM card.

The invention offers an alternative to authentication means providing access to certain services according to certain characteristics of an identification card enabling new applications to make use of the blocking and unblocking principle.

The invention therefore consists in a method of controlling execution of at least one function in a wireless near field communication module of a mobile apparatus adapted to receive identification means, this method comprising the following steps:

transmission of an information request by said wireless near field communication module to said identification means, said information request aiming to at least one item of obtain at least one item of information characteristic of said identification means;

reception of a response to said information request from said identification means, said response containing at least one item of information characteristic of said identification means;

authentication of said response by said wireless near field communication module; and if said response is authenticated, execution of said at least one function in response to said at least one item of information characteristic of said identification means.

The method of the invention therefore authorizes or refuses execution of functions in a wireless near field communication module according to characteristics of an identification card. In particular, authorization or refusal of execution of a function can be linked to the operator that issued the identification card.

In one particular embodiment, the method further comprises the following steps:

reception of an authentication request by said wireless near field communication module; and if said response is authenticated, before execution of said at least one function, transmission by said wireless near field communication module of an authorization to said authentication request in response to said at least one item of information characteristic of said identification means.

In this embodiment, the method of the invention authorizes or refuses execution of functions in a wireless near field communication module according to characteristics of an identification card when those functions are linked to an external device. This embodiment can be used in particular to control access to services.

Again in one particular embodiment, the transmission of information between said identification means and said wireless near field communication module is at least partially effected through a microprocessor of said mobile apparatus, the method comprising the following steps:

transmission of said information request to said microprocessor, said microprocessor being adapted to transmit said information request to said identification means; and/or reception of said response from said microprocessor, said microprocessor having received said response from said identification means.

This embodiment uses the architecture of the mobile apparatus in which the invention is implemented whilst offering a high level of security.

Said response and/or said authorization is advantageously coded or secured so that it can be authenticated, to avoid simulation of the response or the authorization by a fraudulent program.

Again in one particular embodiment, said coding or securing of said response and/or said authorization is based on authentication information stored locally in said identification means or in said wireless near field communication module coding or securing said response and/or said authorization to improve the security of the method. Said authentication information can in particular be a private cryptographic key.

Again in one particular embodiment, said coding or securing of said response and/or said authorization is effected locally in said identification means or in said wireless near field communication module, coding or securing said response and/or said authorization on the basis of authentication information stored locally in said identification means or in said wireless near field communication module coding or securing said response and/or said authorization to improve the security of the method.

To reduce the risk of fraud, said wireless near field communication module is at least partially secure.

In one particular embodiment the function executed by said wireless near field communication module consists in updating data stored in said wireless near field communication module. The method of the invention thus prevents stored data being replaced fraudulently by other data.

The function executed by said wireless near field communication module can also consist in authorizing a wireless communication mode, to or from an external device, from said wireless near field communication module to monitor communication.

The function executed by said wireless near field communication module can thus in particular also limit access to the services to certain types of operator or to certain types of contract.

In one particular embodiment, at least some communication between said identification means and said wireless near field communication modules is secure.

Again in one particular embodiment, said information request includes an indication relating to said at least one function for selectively authorizing or prohibiting some functions.

The invention also consists in a computer program including instructions adapted to execute each of the steps of the method described above.

The invention also consists in removable or non-removable information storage means partly or totally readable by a computer or a microprocessor and containing code instructions of a computer program for the execution of each of the steps of the method described above.

The invention further consists in a control device for the execution of at least one function in wireless near field communication means of a mobile apparatus adapted to receive identification means, this device comprising the following means:
  means for transmitting at least one information request to said identification means, said information request aiming to obtain at least one item of information characteristic of said identification means;
  means for receiving a response to said information request from said identification means, said response including at least one item of information characteristic of said identification card;
  means for authenticating said response; and
  means for executing said at least one function in response to said at least one item of information characteristic of said identification card.

The device of the invention thus authorizes or refuses execution of functions in a wireless near field communication module according to characteristics of an identification card. In particular, authorization or refusal of execution of a function can be linked to the operator that issued the identification card.

In one particular embodiment, said mobile apparatus comprises a microprocessor separate from said authentication means and said execution means so that a security failing of said microprocessor does not affect the security of the device.

The device advantageously further comprises:
  means for receiving at least one authentication request; and
  means for transmitting an authorization to said authentication request in response to said at least one item of information characteristic of said identification card before the execution of said at least one function.

In this embodiment the device of the invention authorizes or refuses execution of functions in a wireless near field communication module according to the characteristics of an identification card if the functions are linked to an external device. This embodiment is used in particular to control access to some services.

The device advantageously further includes coding or securing means adapted to code or secure said authorization so that said authorization can be authenticated to avoid said authorization being simulated by a fraudulent program.

In one particular embodiment, the device further includes storage means for storing authentication information used by said coding or securing means to code or secure said authorization in order to improve the security of the device. Said storage means are advantageously non-volatile. Said storage means are advantageously adapted also to store data for authenticating said response.

Again in one particular embodiment, the identification means consist of an identification card of a subscriber to a mobile telephone network such as a SIM card commonly used in mobile telephone units.

Again in one particular embodiment, said wireless near field communication means conform to the ISO 14443 standard.

Again in one particular embodiment, said wireless near field communication means are integrated into said mobile apparatus non-removably.

Figure 2:
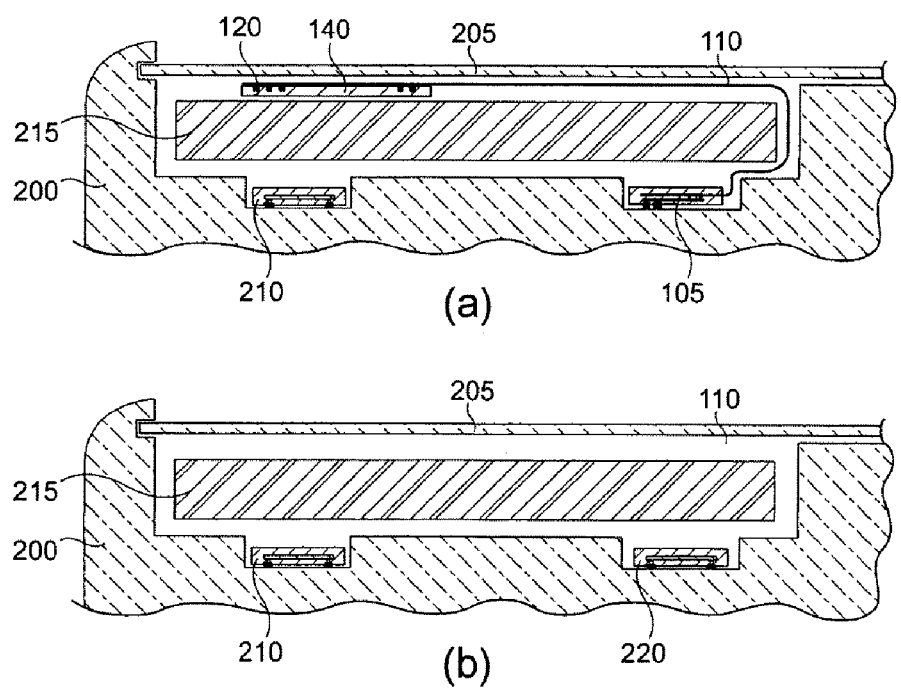
Figure 3:
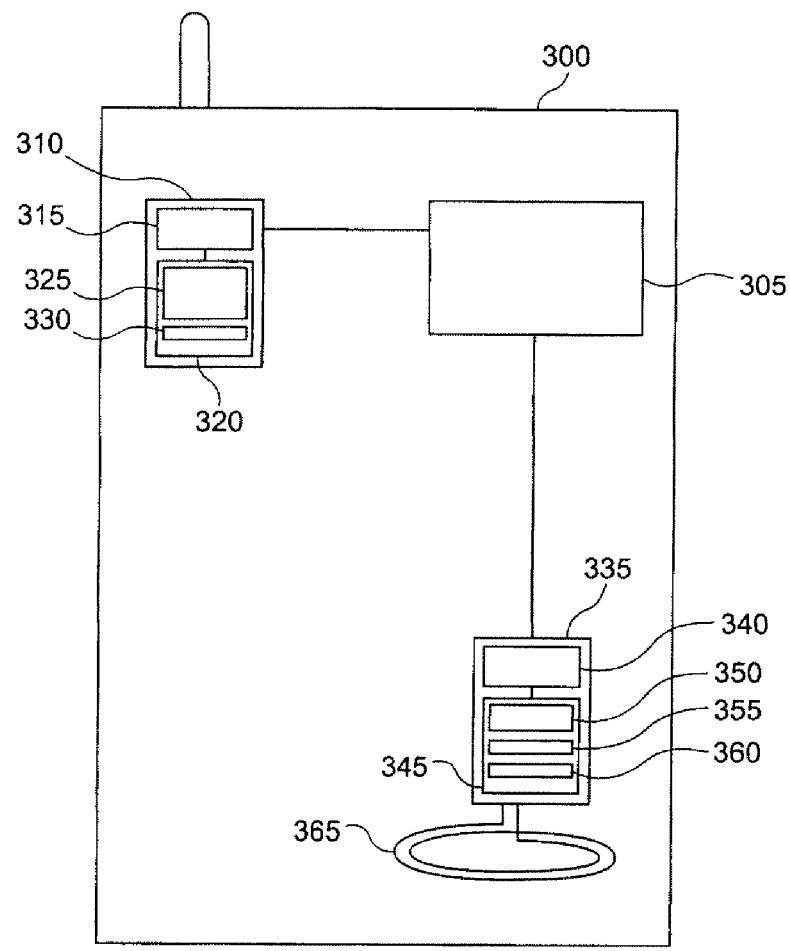
Figure 3:
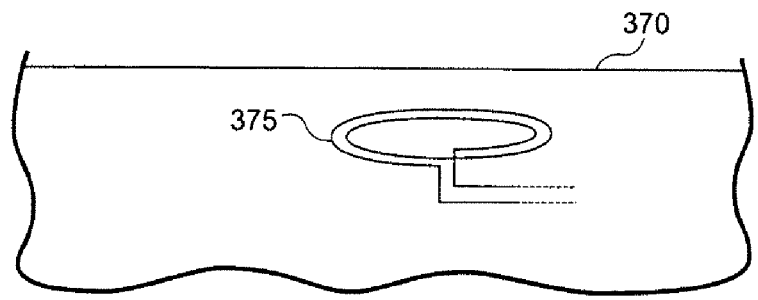
Figure 4:
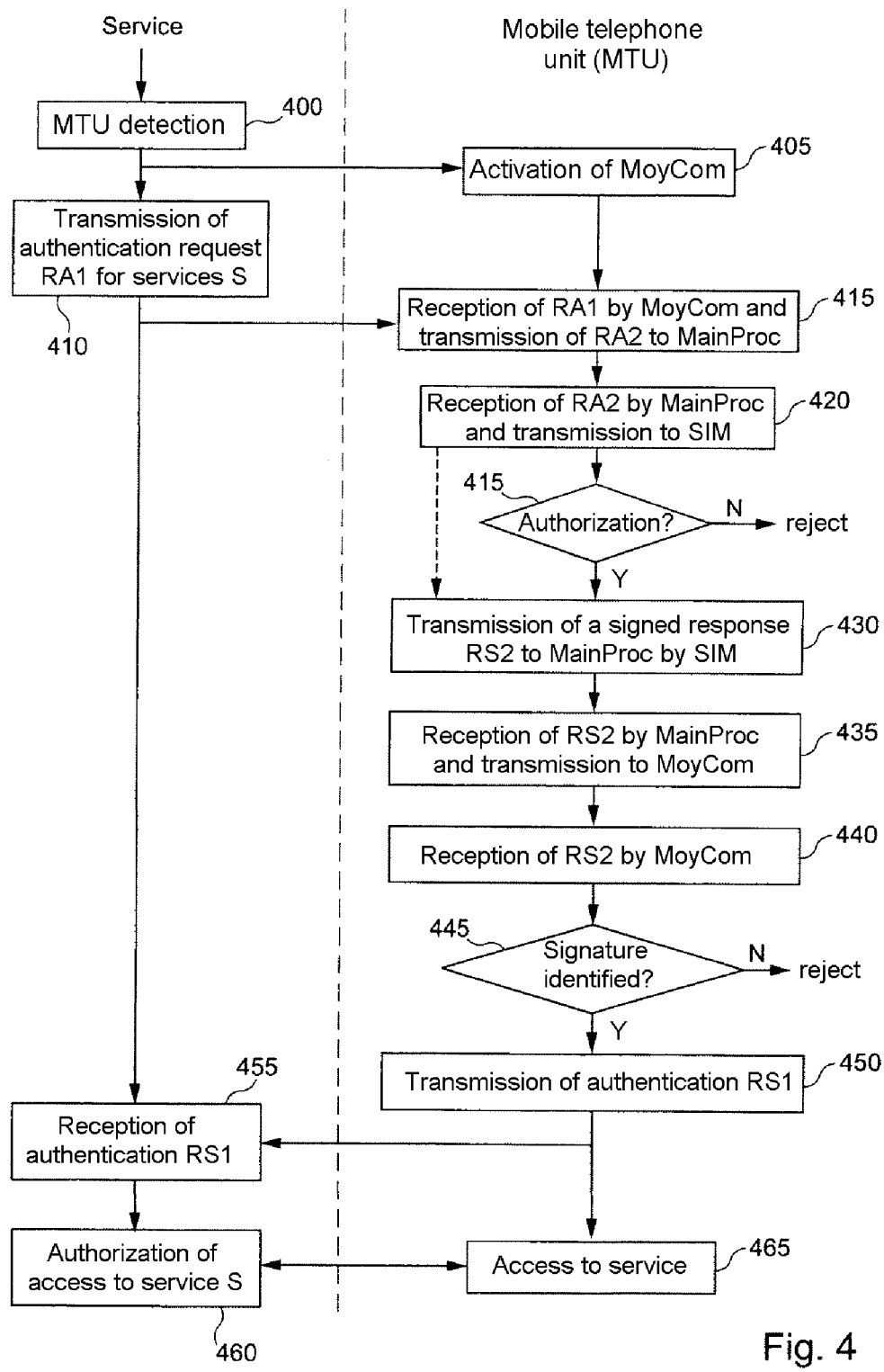

Other advantages, objects and features of the present invention emerge from the following detailed description given by way of nonlimiting example with reference to the appended drawings in which:

FIG. 1, comprising FIGS. 1a and 1b, shows one example of a microcircuit card for wireless near field communication;

FIG. 2, comprising FIGS. 2a and 2b, shows for a mobile telephone application one embodiment of the invention respectively using a microcircuit card similar to that represented in the previous figure and an NFC module;

FIG. 3 shows one example of implementation of the invention in a mobile telephone unit; and FIG. 4 is a diagrammatic representation of one example of an algorithm implementing the invention in the device shown in FIG. 3.

The invention more specifically concerns the use of mobile apparatus such as mobile telephone units able to communicate via a global wireless communication network such as a GMS or UMTS network or via a local area network such as a WiFi network. The invention can also be implemented using other mobile apparatus such as personal digital assistants (PDA). According to the invention, the mobile apparatus includes wireless near field communication means, for example with a range less than one meter, fifty centimeters or twenty centimeters, and an identification module such as a wireless communication network identification module such as a SIM card.

The invention exploits new wireless near field communication technologies that can be integrated into mobile apparatus. For example, the NFC (Near Field Communication) technology offers wireless near field communication means for identification, data exchange and payment applications. Generally operating at a frequency of 13.56 MHz and providing a data transfer rate up to 424 kbit/s, the NFC technology provides simple and reliable communication of data between electronic devices.

According to the invention, such wireless near field communication means are provided with a controller with more restricted or more reliable access than the processor and the operating system of the mobile telephone unit in which they are installed, which offer the possibility of installing software or accessing the memory. This aspect is exploited by the invention to provide a function for partially or totally blocking and unblocking wireless near field communication means that is more resistant to attack, authorizing such means to communicate only in the presence of a SIM card of a specific operator by authorizing or prohibiting execution of some functions in the communication means and/or access to some of the services offered.

These wireless near field communication means can take the form of a microcircuit card including an antenna within its body or remotely located. Such a card is removable. Alternatively, these wireless near field communication means can take the form of a module fixed to the body of the telephone such as an integrated circuit mounted on a printed circuit carrying the antenna or a module such as a circuit and an antenna embedded in plastic. Such a module is non-removable.

In a first embodiment, the wireless near field communication means comprise for example a substantially rigid body such as a plastic material body, with a microcircuit, and a flexible film comprising an antenna connected to the microcircuit, and the antenna carried by the film can extend at least partially beyond the body. One example of an electronic entity adapted to incorporate such a device concerns minicards, for example cards to the ID-000 format. They can be microchip cards, i.e. microcircuit cards conforming to the ISO 7816 standard, the thickness of which is approximately 0.76 mm, and include a secure microcontroller.

They can equally be cards conforming to other formats, such as the MMC (MultiMedia Card), RS-MMC (Reduced-Size MultiMedia Card) or UICC (Universal Integrated Circuit Card) format.

The microcircuit card is preferably adapted to communicate according to the ISO 14443 standard at a frequency of approximately 13.56 MHz.

FIG. 1, comprising FIGS. 1a and 1b, shows an example of a microcircuit card for wireless near field communication means. FIG. 1a is a top view of the microcircuit card while FIG. 1b is a view in section taken along the line A-A.

This card has a substantially rigid card body 105 and a flexible film 110 on which is formed an antenna 120. A microcircuit 115 is integrated into the card body 105. The circuit 115 can be a circuit comprising a secure communication microprocessor and a memory adapted to store a program and coding keys, for example. In one particular embodiment, the circuit 115 includes contact communication means for exchanging data with the mobile telephone unit to which it is connected and contactless communication means for exchanging data with an external electronic device.

The film 110 advantageously comprises three parts, the first being joined to the body to establish contact between the circuit 115 and the antenna 120, the second advantageously comprising two tracks 125 used to connect the antenna 120 to the card body 105, and the third supporting the antenna 120 comprising a bridge 130.

As shown in FIG. 1b, the card body 105 comprises the circuit 115 connected to connectors 135 flush with the surface of the body 105 of the card, establishing an electrical connection with appropriate mobile apparatus when it is inserted into that mobile apparatus. The circuit 115 is also connected to the conductive tracks 125 of the film 110. The antenna 120 is preferably protected by an insulative layer 140 adapted to retain the antenna 120 in a predefined position by pressure. The film 110 is preferably produced in plastic material such as nylon or PVC, i.e. a flexible and strong material.

FIG. 2a shows one example of use of a wireless near field communication card, similar to that shown in FIG. 1, in a mobile telephone application. The body 200 of the mobile telephone unit comprises a triple cavity adapted to receive a microcircuit card, for example a standard SIM card, a wireless near field communication card and a battery. The triple cavity is protected by a cover 205. The portion of the cavity adapted to receive a microcircuit card 210 advantageously comprises connectors so that when the microcircuit card is in place the telephone and the microcircuit card are electrically coupled. The microcircuit card can be retained by a standard locking system (not shown). Likewise, the portion of the cavity adapted to receive a wireless near field communication card 105 preferably comprises connectors so that when the card 105 is in place the telephone and the card are electrically coupled. The card 105 can also be retained by a standard locking system (not shown). Accordingly, when the body of the card 105 is placed in the cavity, the telephone and the circuit 115 are electrically coupled. The film 110 is preferably positioned along the battery 215 so that the antenna 120 is between the battery 215 and the cover 205, as shown.

Placing the antenna 120 between the batch 215 and the cover 205 enables the circuit 115 to exchange data with an appropriate transceiver without contact, limiting spurious effects linked to the body 200 of the telephone and to the battery 215.

Alternatively, in a second embodiment, as shown in FIG. 2b, a wireless near field communication module 220 can be used instead of the card 100 from FIG. 2a. The module 220 then comprises the same elements as the card 100, integrated a component connected to the body of the telephone 200. The module 220 can be connected mechanically or by soldering, and thus the module 220 is typically non-removable.

In the remainder of the description, the expression wireless near field communication module refers interchangeably to cards and components having the features of the module 220 or the card 100, which are similar.

FIG. 3 shows an example of use of the invention in a mobile telephone unit 300. As shown, the mobile telephone unit 300 comprises a main microprocessor 305 used to execute the usual mobile telephone applications and, where appropriate, applications such as PIM (Personal Information Manager) applications or games.

The mobile telephone unit 300 also comprises an identification card such as a SIM card 310. The identification card 310 is a standard SIM card here comprising a microprocessor 315, preferably a secure microprocessor, and a memory 320. The memory 320 is advantageously adapted to store a table 325 containing for example a list of functions or services as well as restrictions on the use of those functions or services. The memory 320 is also adapted to store a cryptographic key for signing data so that analyzing the signed data provides for authentication of the source of the data. The identification card 310 is connected to the microprocessor 305 to enable exchange of data between the microprocessors 305 and 315.

The mobile telephone unit 300 also comprises a wireless near field communication module 335. The module 335 comprises a communication microprocessor 340. The microprocessor 340 is advantageously secure and preferably conforms to the ISO 14443 standard. The module 335 also comprises a memory 345. The memory 345 is adapted to store programs 350 and for example two cryptographic keys 355 and 360. Here a first key 355 is adapted to authenticate the signature of data signed using the key 330 contained in the memory 320 of the identification card 310. The card 335 uses the second key 360 to sign data whose source can then be authenticated. The module 335 also comprises an antenna 365 enabling the module 335 to transmit and receive data to and from the exterior. For purposes of illustration, the antenna 365 is shown here outside the module 335. The module 335 is connected to the microprocessor 305 to enable exchange of data between the microprocessors 305 and 340.

To transmit or receive data the antenna 365 connected to the module 335 must be situated at a near distance from an electronic device 370 comprising an antenna 375 adapted to receive and transmit data from and to the module 335 of the mobile telephone unit 300.

In one advantageous embodiment, communication between the wireless near field communication module 335 and the identification card 310 is secured by the module and the card themselves, for example encrypted, and uses methods known to the person skilled in the art to avoid analysis and simulation of the commands exchanged. Such a method consists, for example, in using an encrypted and signed message containing a message counting mechanism. It should be noted that communication between the wireless near field communication module 335 and the identification card 310 can be wireless communication.

By way of illustration, the electronic device 370 can be a device adapted to control access, such as access to transportation means such as trains or aircraft, hotel rooms, swimming pools or theatres. The electronic device 370 can equally be adapted to authorize the use, temporary or otherwise, of certain applications such as games or to authorize the downloading of contents such as multimedia contents.

FIG. 4 is a diagrammatic representation of one example of an algorithm implementing the invention used in the device shown in FIG. 3 to access services according to the characteristics of the identification card. An embodiment of this kind concerns in particular the possibility of effecting a purchase, for example to purchase a cinema ticket or a train ticket from an automatic machine, with the payment debited to the telephone account.

For clarity, the steps in the left-hand portion of the algorithm represented in FIG. 4 are linked to the service provider while the steps on the right-hand side are linked to the mobile telephone unit.

When it has detected the presence of a mobile telephone unit (step 400), the electronic device 370 sends a signal to activate the wireless near field communication module 335 referred to MoyCom (step 405). Activation can in particular consist in powering up the module 335. An activation signal of this kind conforms to the 14443 standard, for example. Communication between the electronic device 370 and the module 335 is preferably initialized when an activation signal has been sent.

The electronic device 370 then offers access to one or more services referred to S. To this end, the electronic device 370 sends an authentication request referred to RA1 containing a request identifier and advantageously containing an identification of the services offered (step 410) in order to obtain authorization to access the services S.

When the wireless near field communication module 335 of the mobile telephone unit 300 receives the authentication request RA1, it determines its nature, for example to determine if the services offered can be put in use by the mobile telephone unit 300. If so, the module 335 sends an information request referred to RA2 to the microprocessor 305 referred to MainProc of the mobile telephone unit 300 (step 415). The object of the request RA2 is to obtain authorization for the identification card 310 to use the services offered or to determine whether access to those services is prohibited or not. For example, the request RA2 can therefore contain an identifier of the services offered to obtain in return an authorization or a refusal. Alternatively, the request RA2 can contain a simple request for an identity from the identification card in order for the module 335 to be in a position to determine if access to the services offered is authorized, depending on the identity obtained from the identification card. When the microprocessor 305 receives the authentication request RA2 it forwards it to the SIM identification card 310 (step 420). The microprocessor 305 can also display a message on the screen of the telephone or emit an audible or visual signal, for example indicating that the user must enter a validation code.

When it has received the authentication request RA2, the identification card 310 verifies if access to the services associated with the authentication request is authorized by comparing the identifier of the services offered to the information previously stored in the table 325 (step 425). It should be noted here that the identifier of the services offered can be associated with a service, a set of linked services or a set of services to which access can be authorized or refused individually. It can therefore be a question of a single identifier or an identifier set. The table 325 can contain, for example, a list of identifiers of authorized services and a list of identifiers of authorized services. If access to the services is not authorized, the request is rejected. In this case, the identification card return no message (as shown here) or returns a message with a rejection indication.

If access to the services is authorized, the identification card returns an acceptance message RS2 to the microprocessor 305 of the mobile telephone unit 300 (step 430). The acceptance message is preferably signed using the key stored at 330 to avoid that message being simulated by the microprocessor 305, in which a fraudulent program might have been installed. When the signed acceptance message RS1 is received, the microprocessor 305 forwards it to the module 335 (step 435). If the user has entered a validation code, that code can also be transmitted to the module 335. Alternatively, when the request RA2 has been received, the identification card 310 can return, in signed form, one or more of its characteristics in order for the module 335 to be in a position to determine authorization to access or not the services offered. This alternative is shown in dashed outline.

When it has received the signed acceptance message RS2 (step 440), the module 335 verifies the source of the signed acceptance message RS2 using for example the key stored at 355 (step 445). It should be noted that the keys stored at 330 and 355 are such that if a message is signed using the key stored at 330, the key stored at 355 verifies that the message was in fact signed by the key stored at 330. Such algorithms are familiar to the person skilled in the art, in particular the RSA (Rivest Shamir Adleman) algorithm. In this type of algorithm, the key stored at 330 is a private key and the corresponding key stored at 335 is a public key.

If the source of the signed acceptance message RS2 is not recognized, the request is rejected. In this case, the module 335 can either return no message (as shown here) or return a message with a rejection indication.

If the source of the signed acceptance message RS2 is recognized, the request is accepted and the module 335 sends an authentication message RS1 using the key stored at 360 to the electronic device 370 to be authenticated (step 450). The key stored at 360 is preferably a private key.

Alternatively, if the message RS2 is authenticated and contains information on the identification card 310, the module 335 determines from this information whether it can access the services offered. Again, if the module can access the services offered, the module 335 sends an authentication message RS1 using the key stored at 360 to the electronic device 370 to be authenticated.

When the authentication message RS1 has been received, the electronic device 370 verifies the source of the authentication message using a mechanism similar to that described above, for example using a public key corresponding to the private key stored at 360. If the authentication message RS1 is recognized, the electronic device 370 provides the mobile telephone unit 300 with access to the services S (step 460). The mobile telephone unit 300 can then use the services S (step 465).

The private cryptographic key stored in the identification card can be common to a plurality of identification cards. In particular, each operator can use one or more private cryptographic keys to authorize or refuse access by its subscribers, in particular according to the type of subscription.

It should be noted that although a key-based authentication system is used in the embodiment of the invention described here, the invention is not limited to that authentication mode.

In one particular embodiment, the microprocessor 305 of the mobile telephone unit 300 can receive via the mobile telecommunication network programs or program updates to be stored in the memory 350 of the wireless near field communication module 335. In this embodiment, the module 335 does not accept storage of programs or program updates in the memory 350 unless authorized by the identification card 310. The authorization mechanism is then similar to the algorithm described above, in particular with reference to the steps 415 to 445. In this embodiment, authorization concerns the storage function and not access to an offered service.

Again in a particular embodiment, the wireless near field communication module 335, after it has been activated, requests authorization by the identification card 310 before initiating any communication with the electronic entity 370. Again, any such authorization mechanism is similar to the algorithm described above, in particular with reference to the steps 415 to 445.

The module 335 is advantageously at least partly secure, in particular according to the FIPS (Federal Information Processing Standards) or common criteria.

Naturally, to satisfy specific requirements, a person skilled in the field of the invention can apply modifications to the foregoing description.

The invention claimed is:

1. A method of controlling execution of at least one function in a mobile apparatus adapted to receive identification means, the method comprising:
   transmitting within the mobile apparatus, an information request from a wireless near field communication module separate from the identification means within the mobile apparatus to a processor of said identification means within the mobile apparatus, said information request aiming to obtain at least one item of information characteristic of said identification means;
   receiving by the wireless near field communication module within the mobile apparatus, a response to said information request from said identification means, said response containing at least one item of information characteristic of said identification means;
   authenticating, within the mobile apparatus, said response by said wireless near field communication module; and
   if said response is authenticated, executing said at least one function in said wireless near field communication module in response to said at least one item of information characteristic of said identification means, said at least one function comprising initiating a communication with a wireless near field communication device external to the mobile apparatus.

2. The method according to claim 1, further comprising the following steps:
   receiving an authentication request by said wireless near field communication module; and
   if said response is authenticated, before execution of said at least one function, said wireless near field communication module transmitting an authorization to said authentication request in response to said at least one item of information characteristic of said identification means.

3. The method according to claim 1, wherein the transmission of information between said identification means and said wireless near field communication module is at least partially effected through a microprocessor of said mobile apparatus, the method further comprising the following steps:
   transmitting said information request to said microprocessor, said microprocessor being adapted to transmit said information request to said identification means; and/or
   receiving said response from said microprocessor, said microprocessor having received said response from said identification means.

4. The method according to claim 2, wherein said response and/or said authorization is coded or secured so that it can be authenticated.

5. The method according to claim 4, wherein said coding or securing of said response and/or said authorization is based on authentication information stored locally in said identification means or in said wireless near field communication module, coding or securing said response and/or said authorization.

6. The method according to claim 5, wherein authentication information is a private cryptographic key.

7. The method according to claim 5, wherein said coding or securing of said response and/or said authorization is effected locally in said identification means or in said wireless near field communication module, coding or securing said response and/or said authorization on the basis of authentication information stored locally in said identification means or in said wireless near field communication module coding or securing said response and/or said authorization.

8. The method according to claim 1, wherein the object of said at least one function is to update data stored in said wireless near field communication module, to authorized wireless communication to or from an external device by said wireless near field communication module, or to access at least one service offered by an external device.

9. The method according to claim 1, wherein at least some communication between said identification means and said wireless near field communication module is secure.

10. The method according to claim 1, wherein said information request includes an indication relating to said at least one function.

11. A non-transitory computer-readable storage medium on which is stored computer-executable code of a computer program that comprises instructions that, when executed by a mobile apparatus having a wireless near field communication module and identification means with a separate processor, causes the mobile apparatus to execute the steps of:
   transmitting within the mobile apparatus, an information request by said wireless near field communication module separate from the identification means in the mobile apparatus to the processor of said identification means in the mobile apparatus, said information request aiming to obtain at least one item of information characteristic of said identification means;

receiving, by the wireless near field communication module within the mobile apparatus, a response to said information request from said identification means, said response containing at least one item of information characteristic of said identification means;

authenticating, within the mobile apparatus, said response by said wireless near field communication module; and if said response is authenticated, executing said at least one function in the wireless near field communication module in response to said at least one item of information characteristic of said identification means, said at least one function comprising initiating a communication with a wireless near field communication device external to the mobile apparatus.

12. A control device for executing at least one function in wireless near field communication means of a mobile apparatus adapted to receive identification means, the control device comprising in the mobile apparatus:

means for transmitting within the mobile apparatus at least one information request from the wireless near field communication means separate from the identification means in the mobile apparatus to a processor of said identification means in the mobile apparatus, said information request aiming to obtain at least one item of information characteristic of said identification means;

means for receiving, by said wireless near field communication means within the mobile apparatus a response to said information request from said identification means, said response including at least one item of information characteristic of said identification means;

means for authenticating, within the mobile apparatus, said response by said wireless near field communication means; and means for executing said at least one function in the wireless near field communication means in response to said at least one item of information characteristic of said identification means, said at least one function comprising initiating a communication with a wireless near field communication device external to the mobile apparatus.

13. The control device according to claim 12, wherein said mobile apparatus comprises a microprocessor separate from said authentication means and said execution means.

14. The control device according to claim 12, further comprising the following means:

means for receiving at least one authentication request; and means for transmitting an authorization to said authentication request in response to said at least one item of information characteristic of said identification means before the execution of said at least one function.

15. The control device according to claim 14, further comprising coding or securing means adapted to code or secure said authorization so that said authorization can be authenticated.

16. The control device according to claim 15, further comprising storage means for storing authentication information used by said coding or securing means to code or secure said authorization.

17. The control device according to claim 16, wherein said storage means are nonvolatile.

18. The control device according to claim 16, wherein said storage means are adapted also to store data for authenticating said response.

19. The control device according to claim 12, wherein the identification means are an identification card of a mobile telephone network subscriber.

20. The control device according to claim 12 wherein said wireless near field communication means conform to the ISO 14443 standard.

21. The control device according to claim 12, wherein said wireless near field communication means are integrated into said mobile apparatus non-removably.

\* \* \* \* \*